(12) United States Patent
Steer et al.

(10) Patent No.: US 6,343,213 B1
(45) Date of Patent: *Jan. 29, 2002

(54) METHOD TO PROTECT AGAINST INTERFERENCE FROM MOBILE RADIOS

(75) Inventors: David Steer; Koon Hoo Teo, both of Nepean (CA)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/957,025
(22) Filed: Oct. 24, 1997
(51) Int. Cl.⁷ .......................... H04M 1/68; H04Q 7/20
(52) U.S. Cl. ........................ 455/411; 455/449
(58) Field of Search .................. 455/522, 456, 455/457, 419, 421, 411, 449; 174/35 MS, 35 R; 109/49.5

(56) References Cited

U.S. PATENT DOCUMENTS

| | | | | |
|---|---|---|---|---|
| 5,224,150 A | * | 6/1993 | Neustein | 340/7.44 |
| 5,390,338 A | * | 2/1995 | Bodin et al. | 455/522 |
| 5,442,805 A | * | 8/1995 | Sagers et al. | 455/456 |
| 5,548,800 A | * | 8/1996 | Olds et al. | 455/12.1 |
| 5,774,787 A | * | 6/1998 | Leopold et al. | 455/12.1 |
| 5,940,764 A | * | 8/1999 | Mikami | 455/456 |
| 6,011,323 A | * | 1/2000 | Camp | 455/117 |
| 6,011,973 A | * | 1/2000 | Valentine et al. | 455/456 |
| 6,122,486 A | * | 9/2000 | Tanaka et al. | 455/68 |
| 6,188,883 B1 | * | 2/2001 | Takemura | 455/411 |
| 6,246,891 B1 | * | 6/2001 | Isberg et al. | 455/574 |

FOREIGN PATENT DOCUMENTS

| | | | | |
|---|---|---|---|---|
| EP | 0 830 046 | * | 3/1998 | H04Q/7/38 |
| GB | 2253968 | * | 9/1992 | |
| JP | H09-051576 | * | 2/1997 | H04Q/7/38 |
| JP | H10-313481 | * | 11/1998 | H04Q/7/38 |

OTHER PUBLICATIONS

Weiss et al. Convnetional Local Area Radio Coverage System, Motorola Technical Depelopments, 1991.*

* cited by examiner

*Primary Examiner*—Vivian Chang
*Assistant Examiner*—Charles N. Appiah

(57) ABSTRACT

A problem with mobile radio systems is the potentially harmful interference they may cause to other electronic equipment. Such interference can be dangerous and even life-threatening in hospitals and aircraft. Interference to automobile electronic braking systems, air bag actuators, or train system controls are examples of other areas where radio system interference must be prevented to preserve the safety of operators and passengers. The present invention provides a system whereby mobile radios, e.g. cellular phones, can be operated safely in regions where interference could cause serious problems or can be prevented from operating. The mobile radios are provided with a low power mode of operation and are commanded, via their signalling channels, to operate in the low power mode when within range of a low power signal from a base station within a protected area. In some areas where it may be undesirable for the mobile radio to operate, even at low power levels, the base station may broadcast an inhibiting signal which will instruct the mobile radio not to operate its transmitter while in the area.

2 Claims, 6 Drawing Sheets

METHOD TO PROTECT AGAINST INTERFERENCE FROM MOBILE RADIOS

BACKGROUND OF THE INVENTION

A significant problem with mobile radio systems is the potentially harmful interference they may cause to other electronic equipment. As the use of mobile radios becomes more widespread, the occurrence of this interference will become more frequent. The problem is usually caused by the close proximity of the mobile radio transmitter to another piece of electronic equipment and the sensitivity of that equipment to extraneous signals.

There are two places where this problem is particularly dangerous, and perhaps life-threatening. These are in hospitals and in aircraft. As electronic control systems pervade other environments, however, the areas of danger will increase. Interference to automobile electronic braking systems, air bag actuators, or train system controls are examples of the areas where radio interference must be prevented to preserve the safety of operators and passengers.

Presently, the method used to prevent interference of this sort is simply to prohibit the use of mobile radios in sensitive areas. Passengers on aircraft are routinely told not to use their cellular phones. Doctors and staff are routinely told not to bring their cellular phones into some areas of the hospital. Unfortunately not everyone understands the danger and some operate their phones anyway. Some people use their cellular phones in aircraft, even some radio engineers who have said that because they know the aircraft radio frequencies are not the same as the cellular phone frequencies, there can be no interference and thus they are justified in using their mobile phone. They do not understand that interference between electronic systems may occur even when the systems operate in separate bands. Few people understand that even if they are not talking on the phone, if the phone is in "standby" mode, it may be still active and occasionally transmitting on the signalling channels and thus still a potential source of interference. As more and more people carry and use mobile phones, there will be more and more operation in areas where they are nominally prohibited.

As mobile radio systems are increasingly used for data communications, either through mobile radio systems or separate radio data services, many people will be operating these systems in prohibited areas not realizing that the warning not to operate their cellular phone also applies to their mobile radio fax modem or a data service. Many lap top computers with radio modems are operated on aircraft and there is a potential that these will be operated and interfere with the aircraft equipment.

SUMMARY OF THE INVENTION

Because it is impossible to prevent people operating their cellular phones (mobile radios) in sensitive areas, the present invention provides an arrangement whereby they can be operated safely in these areas, or the mobile radio can be signalled that it must not operate.

An effective means to limit the possibility of interference is to reduce the mobile radio transmit power. Several of the radio standards do provide low power modes of operation. If the mobile radio is commanded, via the signalling channels, to operate in the low power modes, their operation may be safe in some areas. Further, the signalling channels may also be used to broadcast (at low power) a message to the mobile handset which prohibits the handset from operation in areas where no level of mobile emissions can be tolerated. Thus the combination of low power operation and appropriate signalling commands can provide a means to protect sensitive areas from mobile radio interference.

The present invention operates in the following way:
(a) A base station with coverage in the sensitive area is installed and operated at a power level such as to be below the level of susceptibility of the sensitive equipment in the area.
(b) The base station providing coverage in the sensitive area sends signalling messages, using the signalling mechanisms in the air interface standard, instructing the mobile radios to operate in low power mode when they are within range. The low power level for the area is selected to be below the level of susceptibility for the sensitive equipment in the area.
(c) The mobile radio operation is controlled such that, before it makes any transmissions, it receives and interprets the local signalling channels and if any channel is broadcasting a "low power" command, it only responds to that signalling station and in low power mode. (This is required to prevent areas of overlapping coverage allowing a mobile to operate at high power in a sensitive area. The installation of the cell sites should be such that overlaps are minimized.)
(d) In some sensitive areas where it may be undesirable for the mobile equipment to operate, even at low power levels, the base station may broadcast an inhibiting signal which will instruct the mobile never to operate its transmitter. This inhibiting process may happen in three ways. In one case, where low levels of radio signals are possible, the base station may transmit a continuous inhibiting signal. In the second case, such as on an aircraft where the base station may operate while the aircraft is on the ground, but it may not be possible to operate the base station while in the air, the inhibit signal should deactivate all the mobiles in the area, and these mobiles should remain inactive until they receive an enabling signal from the same base station after the aircraft has landed and safe operation is possible again. In the third case, one or more base stations may be arranged in a protective ring around the sensitive region where all transmissions are prohibited. All mobiles passing through this ring would be signalled to inhibit their operation until they receive a corresponding enabling signal when they pass out of the sensitive area. To provide this on/off capability, two rings of coverage with the signalling could be used, one outer ring would provide an enabling signal to mobiles passing outwards, and the inner ring would disable mobiles passing inwards.

With this combination of low power operation and control by signalling messages the possibility of interference to equipment sensitive areas may be minimized.

SUSCEPTIBILITY LEVEL

The interference is usually simply related to the radiated power of the radio transmitter and the proximity to the sensitive equipment. For some systems, voluntary susceptibility standards are defined. For medical equipment, for example, this is nominally 3 volts per meter. This susceptibility level may be used to define the safe mobile radio power limit in proximity to the sensitive equipment. For the CT2[1] equipment (operating at 864 MHz), for example, the nominal operating power is +10 mW with a low power mode 16 dB below that. The minimum safe separation distance from the CT2 mobile radio and the sensitive electronic equipment may thus be calculated as approximately:

|  | standard power | low power |
| --- | --- | --- |
| susceptibility level | −4 dBm | −4 dBm |
| tx power | 10 dBm | −6 dBm (low) |
| antenna gain | 2 dB | 2 dB |
| separation | .17 m | .028 m |

The use of the low power mode thus reduces the separation distance between the mobile radio and the equipment from about 0.17 meter to about 0.028 meters (about an inch). Thus the CT2 radio, in the low power mode, would need to be on top of the sensitive equipment to begin to approach the susceptibility limit. It has been observed that Nortel (trademark) CT2 and similar radio systems operate in the low power mode a significant proportion of the time (about 40%). A similar low power level may be defined for other radio standards. The AMPS[2], DECT[3] and the CDMA4[4]

1 ETSI Standard 300-131/TIA Standard-661
2 TIA Standard IS54/IS136
3 ETSI Standard 300-175/TIA Standard-662
4 TIA Standard IS95 standards already include controlled power levels for the mobile handsets. If the low power modes of operation for the handsets can be assured through signalling mechanisms, safe operation may be possible in otherwise prohibited regions.

Manufacturers of mobile radio products are often asked how and if it is safe to operate them in sensitive areas. By means of the present invention to assure the low power operation through signalling messages, radio systems in sensitive areas can be provided. The signalling protocols of the relative standard(s) would need to be extended to assure the guaranteed low power operation.

The use of mobile radios is widespread, but they are prohibited in hospitals and aircraft. If an extension of the standards is made to provide the assured low power operation, then the equipment may be used in more areas and without the danger of inadvertent interference because someone forgot or ignored a request to turn off the radio equipment.

According to a broad aspect of the invention there is provided a method for causing mobile radio equipment having a transmitter and a receiver to transmit only at a low power level when within a protected zone which may contain equipment subject to interference from radio transmissions within said zone, said method comprising providing at least one protection base station within said protected zone which transmits command signals, at a power level below a level which would interfere with said equipment, that radio transmitters are to be at a low power level, and providing said mobile radio equipment with means for receiving said command signals and means responsive to said received command signals for causing the transmitter of said mobile radio equipment to transmit at a low power level.

According to another broad aspect of the invention there is provided a method for causing mobile radio equipment having a transmitter and a receiver to not transmit when within a full protected zone which may contain equipment subject to interference from radio transmission, said method comprising providing a command zone surrounding said full protected zone and a clear zone surrounding said command zone, generating command signals in said command zone to inhibit said mobile radio equipment from transmitting radio signals, whereby if said mobile radio equipment enters said command zone from said clear zone it is inhibited from transmitting radio signals until it leaves said command zone and enters said clear zone, whereas it is still inhibited from transmitting radio signals if it moves from said command zone and enters said full protected zone.

According to another broad aspect of the invention there is provided mobile radio equipment having a transmitter and a receiver, said transmitter having means, responsive to control signals received by said receiver, to transmit only at a low power level.

According to another broad aspect of the invention there is provided a radio communication system comprising a plurality of base stations and mobile stations, at least one of said base stations having means to transmit command signals within an area that said mobile stations are to transmit only at a low power level, said mobile stations having means responsive to said command signals to cause them to transmit only at a low power level.

DESCRIPTION OF THE PREFERRED EMBODIMENTS

Figure 1:
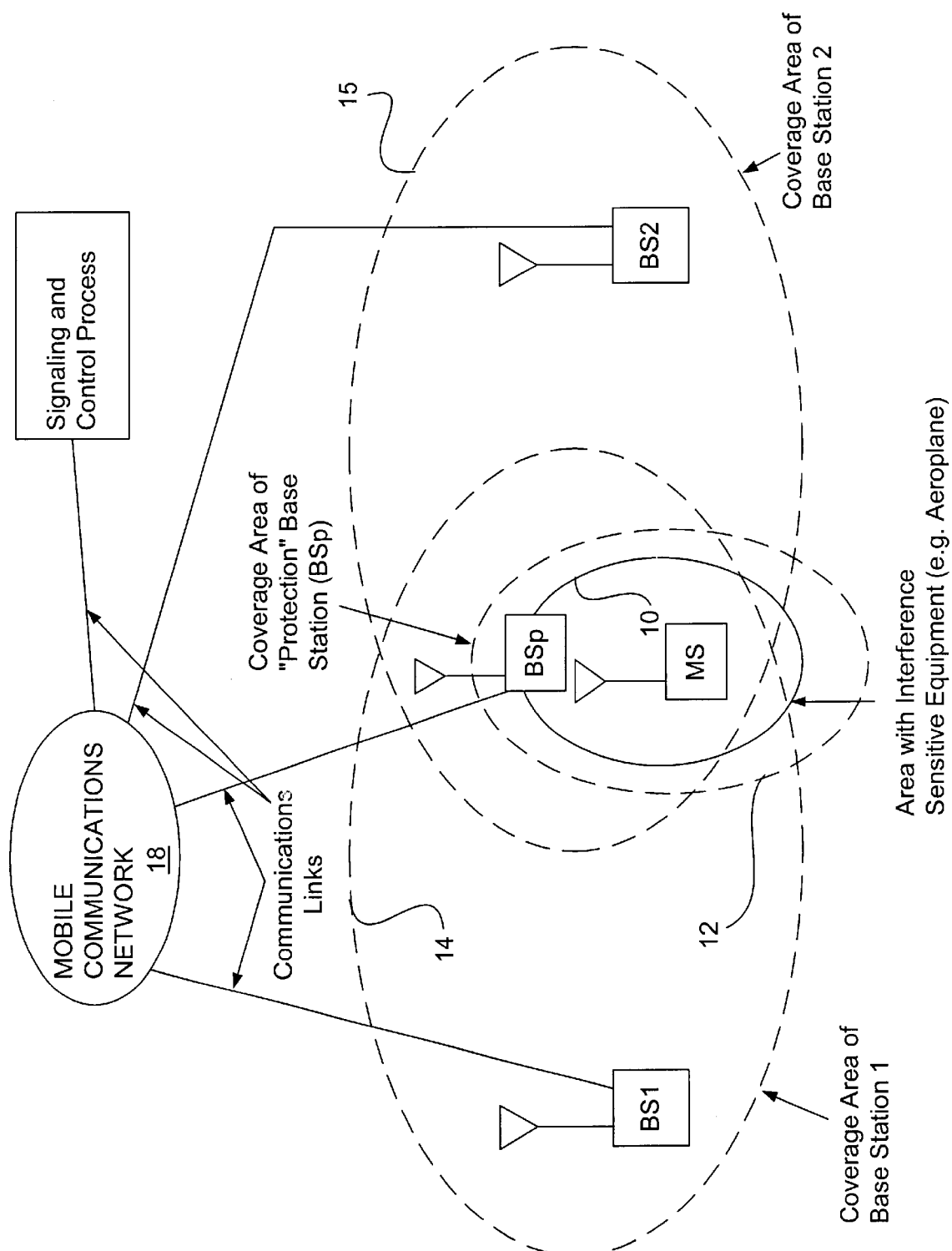
FIG. 1 is a diagram illustrating coverage areas of two base stations and of a "protection" base station, as well as of a mobile station.

Referring to FIG. 1, a mobile station MS is shown within an area 10 which is assumed to contain interference sensitive equipment, e.g. an aeroplane. The protected area 10 is within the coverage area 12 of "protection" base station BSp and also within the coverage areas 14, 15 of base stations $BS_1$ and $BS_2$. The mobile station MS communicates via base stations with the mobile communications network 18 and signalling control process over communications links. It also can receive commands, via its signalling channels, to operate in a low power mode so that its operation may be safe in some areas. The signalling channels may also be used to broadcast, at low power, a message to the mobile station MS which prohibits it from operation in areas where no level of mobile emissions may be tolerated.

Figure 2:
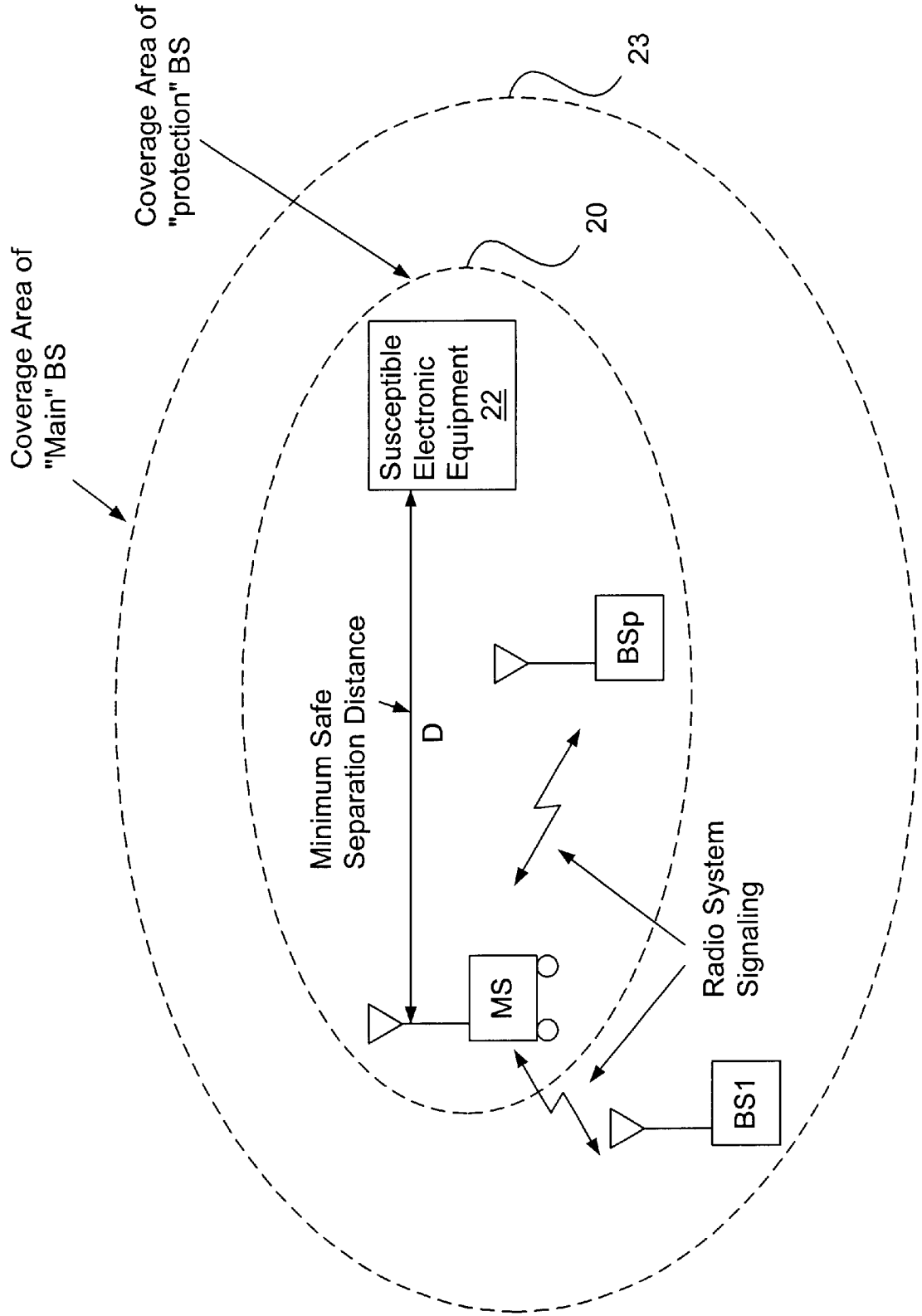
FIG. 2 shows a protected zone within a main base station zone, as well as a mobile station at a minimum safe separation distance from a piece of electronic equipment which is susceptible to radio interference.

Referring to FIG. 2, a mobile station MS is shown within the coverage area 20 of "protection" base station BSp and at a minimum safe separation distance D from susceptible electronic equipment 22. Low power signals from protection base station BSp cause the mobile station MS to operate in a low power mode. In the low power mode it can communicate with main base station $BS_1$ or BSp within coverage area 23.

Figure 3:
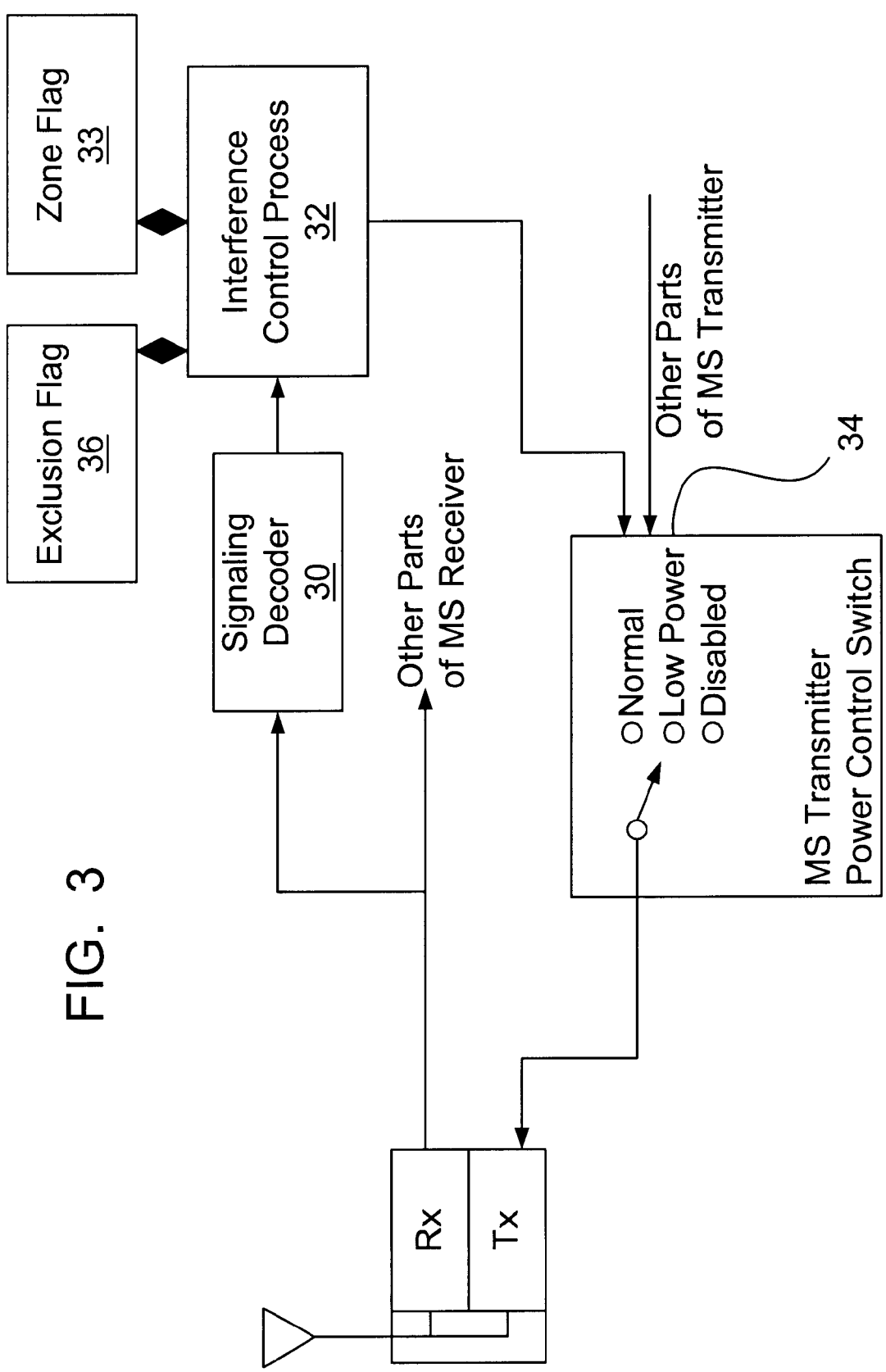
FIG. 3 is a block diagram of parts of a mobile station according to the invention which enables it to be switched to a low power mode.

FIG. 3 is a block diagram of parts of a mobile station involved in implementing low power operation according to the present invention. A signal from a protection base station to operate in low power mode is detected by the receiver portion Rx of the mobile station MS and decoded by signalling decoder 30. An interference control process 32, in response to an output from signalling decoder 30, switches the MS transmitter power control switch 34 from "normal" to "low power" so that transmitter Tx then transmits in the low power mode. The exclusion flag 36 and zone flag 33 are used by the interference control process as a means to remember the power condition of the mobile transmitter (as described later in FIG. 6).

Inside a fully protected zone, the interference control process 32 responds to an appropriate signal received by receiver Rx and decoded by signalling decoder 30 by switching the mobile station power control switch 34 to the disabled position so that the transmitter Tx ceases to transmit.

Figure 4:
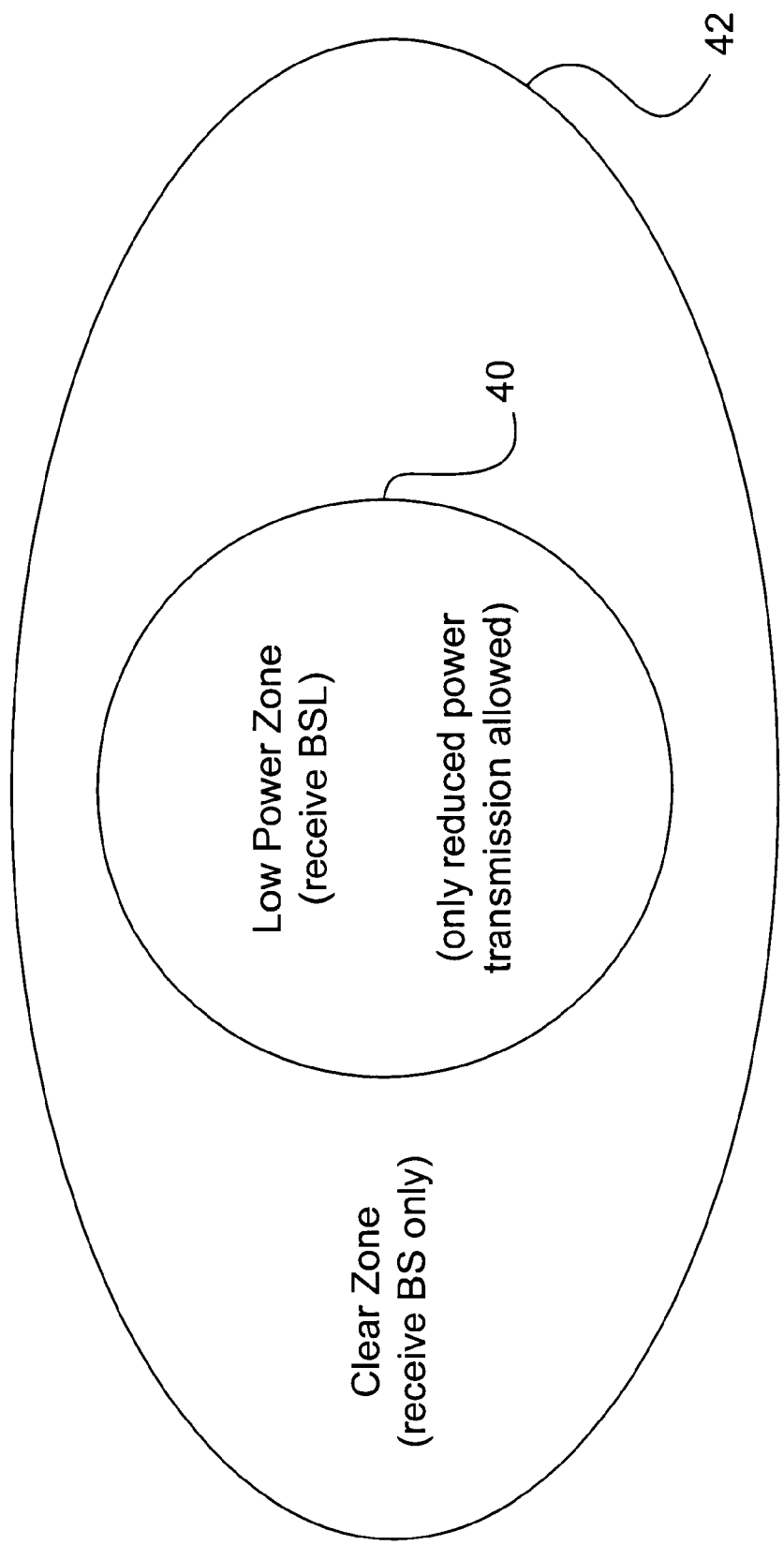
FIG. 4 illustrates a low power zone within a clear zone.

Referring to FIG. 4, there is shown a low power zone 40 within a clear zone 42. In the low power zone, only reduced power transmissions by the mobile station are allowed. The low power zone is defined by a region in which command signals from the protective base station (not shown) can be received by the mobile station. The low power zone may be, for example, an aircraft with a small local base station acting as the source of the command signals and the means for communication with the mobile network. The mobile station, as it moves from the clear zone 42 into the low power zone 40 is instructed by the interference control process in the mobile station to operate its transmitter in a low power mode. The mobile station, as it moves from the low power zone into the clear zone, is instructed by the interference control process in the mobile station to operate its transmitter in the normal mode.

Figure 5:
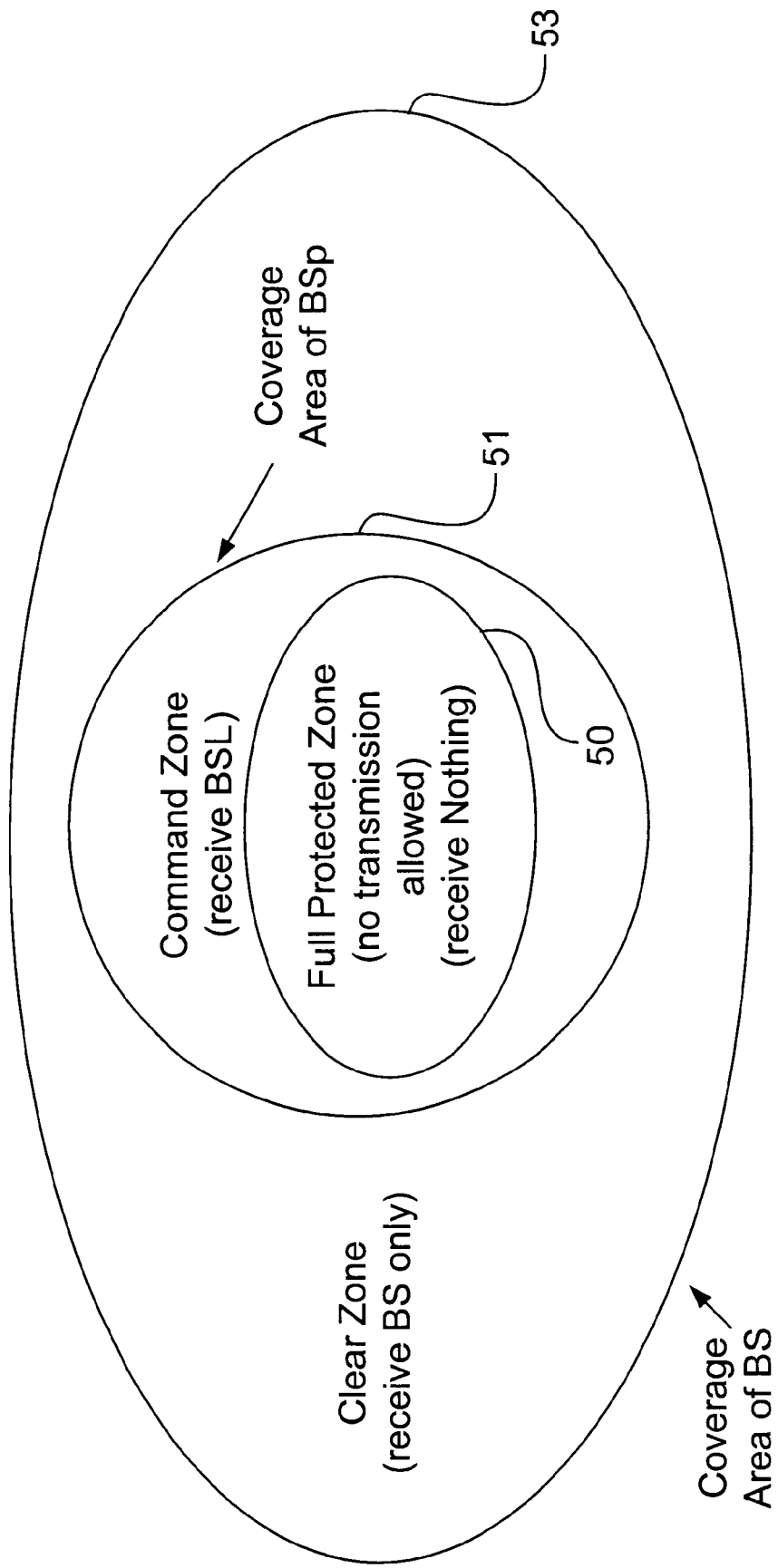
FIG. 5 shows a full protected zone within a command zone which, in turn, is within a clear zone.

FIG. 5 illustrates a Full Protected Zone 50 within a Command Zone 51 which, in turn, is within a clear zone 53. In the Full Protected Zone, no transmissions by a mobile station (not shown) are allowed. The Full Protected Zone is defined by a region in which neither the base station BS nor the protection base station BSp can be received by the mobile station. The full protected zone may, for example, be a shielded room inside the coverage areas of the base station BS and protection base station BSp. The mobile station in response to signalling from BSp, as it moves from the Clear Zone 53, through the Command Zone 51 into the protected zone 50 is instructed by the interference control process in the mobile station to disable its transmitter. The mobile station, as it moves out of the protected zone 50, through the Command Zone 51 into the Clear Zone 53 is instructed by the interference control process in the mobile station to enable its transmitter.

Figure 6:
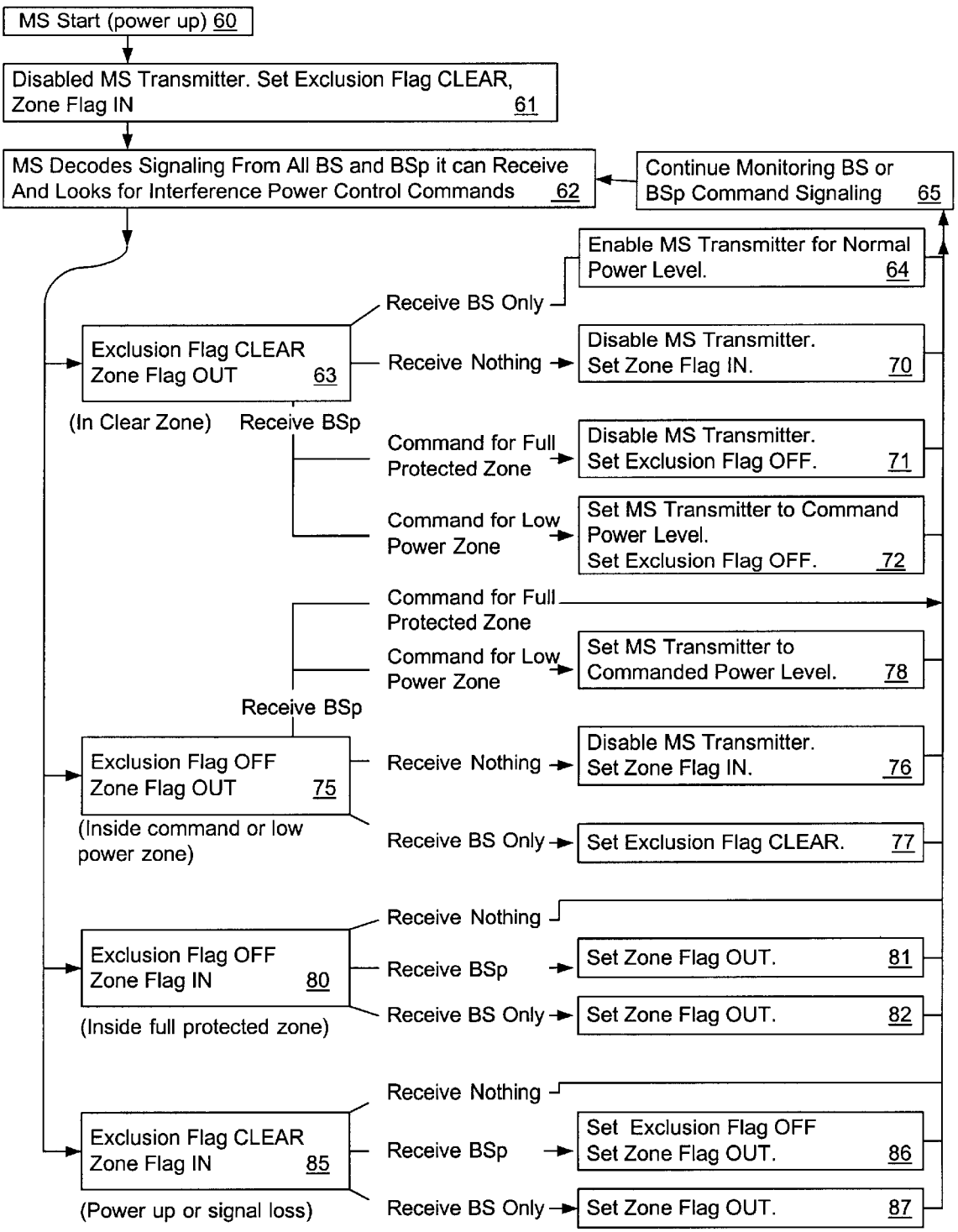
FIG. 6 is a flow chart of the operation of the system according to the invention.

FIG. 6 is a flow chart which details operation of the interference control process in various possible situations.

Referring to FIG. 6, block 60 represents the start of operation or "power up" of a mobile station MS. After power up of the mobile station MS, the interference control process, at step 61, disables the MS transmitter, sets an exclusion flag CLEAR and sets a zone flag IN. The process then causes, step 62, the MS to decode signalling from all base stations BS and BSp it can receive and look for interference power control commands.

The four boxes 63, 75, 80 and 85 in FIG. 6 represent the four possible combinations of the states of the exclusion flag and zone flag, which are as follows:

| Exclusion flag | Zone flag |
|---|---|
| CLEAR | OUT |
| OFF | OUT |
| OFF | IN |
| CLEAR | IN |

The states of the flags represent possible conditions when signalling is received by the MS, i.e. whether the MS is in the clear, moving into, moving out of, or inside the protected zone. The signalling received (or lack of signal received) then cause the control process to alter the state of the flags or the transmitter power level if needed.

If the MS is in a clear zone, step 63, the zone flag is in the 'OUT' state and the exclusion flag is in the 'CLEAR' state. If the MS only receives signals from ordinary base stations BS, the process, step 64, enables the MS transmitter for normal power level. The MS continues to monitor, step 65, for BS or BSp (protection base station) command signalling.

If, at step 63, the MS receives no signals from BS or BSp, the MS transmitter is disabled and the zone flag is set to IN, step 70, after which the MS continues monitoring for BS or BSp command signalling, step 65.

If, at step 63, the MS receives a BSp command indicating a full protected zone, the MS transmitter is disabled and the exclusion flag set to OFF, step 71, followed again by step 65 (monitoring for BS and BSp command signalling). If the MS receives at step 63 a BSp command indicating a low power zone, the MS transmitter is set to the commanded power level (low) and the exclusion flag is set to OFF, step 72. Step 72 is followed by monitoring, step 65.

If, at step 62, the MS is inside a low power zone or a command zone, the exclusion flag is in the OFF state and the zone flag is in the OUT state, step 75. If the MS then receives nothing, the process disables the MS transmitter and sets the zone flag to IN, step 76. The MS then monitors for BS or BSp command signalling, step 65.

If, after step 75, the MS receives only signals from base station BS, the exclusion flag is set to CLEAR, step 77 and the MS continues monitoring, step 65.

If, after step 75, the MS receives a command from a base station BSp for a full protected zone, the MS simply continues monitoring for BS or BSp command signalling, step 65. On the other hand, if the command is for a low power zone, the MS transmitter is set to the commanded power level, step 78, after which it resumes monitoring, step 65.

If, at step 62, the MS is inside a full protected zone, the exclusion flag is in the OFF state and the zone flag is in the IN state, step 80. If the MS then receives nothing, it continues monitoring, step 65. If it receives a command from BSp, the zone flag is set to OUT, step 81, and the MS resumes monitoring, step 65. If the MS receives only signals from base station BS, the zone flag is set to OUT, step 82, and the MS resumes monitoring, step 65.

Upon power up of the MS, or if it experiences signal loss, step 85, the exclusion flag will be in the CLEAR state and the zone flag in the IN state. If the MS then receives nothing, it continues monitoring, step 65. If it receives commands from base station BSp indicating a protected zone, the exclusion flag is set to OFF and the zone flag is set to OUT, step 86, after which monitoring is resumed, step 65. If the MS receives only signals from BS, the zone flag is set to out, step 87, and monitoring resumed, step 65.

We claim:

1. A radio communication system comprising a plurality of base stations having respective coverage areas and a plurality of mobile stations and at least one protection base station having a coverage area which falls at least partly within the coverage area of at least one of the plurality of base stations, the coverage area of the protection base station defining a command zone surrounding a fully protected zone which cannot receive any control signals and which encompasses equipment that is susceptible to interference by transmission from the mobile stations, a portion of the coverage area of the at least one of the plurality of base stations lying outside the command zone defining a clear zone, wherein the protection base station has means to transmit command signals to command the mobile stations not to transmit and wherein the mobile stations have means responsive to the command signals and to signals from the base station within whose coverage area the coverage area of the protection base station falls to cause mobile stations moving from the clear zone through the command zone into the fully protected zone to disable their transmitters and to cause mobile stations moving out of the fully protected zone through the command zone into the clear zone to enable their transmitters.

2. A mobile station for use in a radio communication system comprising a first base station defining a coverage area, a protection base station having a coverage area falling within the coverage area of the first base station, the coverage area of the protection base station defining a command zone surrounding a fully protected zone and a portion of the coverage area of the first base station lying outside the command zone defining a clear zone, the mobile station comprising a transmitter, a receiver, means connected between the receiver and the transmitter, responsive to signals from the first base station and to command signals transmitted by the protection base station and present only in the command zone surrounding the fully protected zone, the means responsive causing the mobile radio as it moves from the clear zone through the command zone into the fully protected zone to disable its transmitter and causing the mobile radio when it moves out of the fully protected zone through the command zone into the clear zone to enable its transmitter.

* * * * *